Patented Feb. 13, 1945

2,369,377

UNITED STATES PATENT OFFICE 2,369,377

METHOD OF PREPARING SULPHUR COMPOUNDS

Carlisle M. Thacker, Highland Park, Ill., assignor to The Pure Oil Company, Chicago, Ill., a corporation of Ohio No Drawing. Application December 28, 1940, Serial No. 372,183

9 Claims. (Cl. 23—206)

This invention relates to a method for converting hydrocarbons either pure or mixed into sulphur compounds and more particularly to a method for converting normally gaseous olefinic hydrocarbons into carbon disulphide.

An object of this invention is to provide a method for converting hydrocarbons into organic sulphur compounds.

Another object of this invention is to provide a method for converting olefinic hydrocarbons such as $C_3$ and $C_4$ hydrocarbons into carbon disulphide.

Still another object of this invention is to provide a catalytic method for converting normally gaseous olefinic hydrocarbons into carbon disulphide wherein the rate of catalyst deterioration is greatly reduced.

A further object of this invention is to provide a method of controlling the reaction of normally gaseous olefins with sulphur at elevated temperature.

Other objects of my invention will become apparent from the following description:

It has been found that when hydrocarbons such as normally gaseous olefinic hydrocarbons are converted into sulphur compounds, principally carbon disulphide, by contacting the hydrocarbons with sulphur at elevated temperatures in the presence of catalysts such as those described in copending applications filed in the name of Carlisle M. Thacker, Serial Nos. 177,411, 249,161, 294,319 and 326,963 dated December 1, 1937, January 3, 1939, September 11, 1939, and March 30, 1940, respectively, there is a relatively rapid formation of undesirable tarry, high boiling materials. These materials detract from the yield of more desirable compounds such as carbon disulphide, have a tendency to deposit in and plug transfer lines and catalyst chambers and by a blanketing action effectively reduce the surface area of the catalyst available for contacting the reactants thereby greatly reducing the catalyst efficiency. Catalysts which are useful in accordance with the aforementioned applications include oxides or sulphide of vanadium, manganese, copper, iron, cobalt, nickel, chromium, molybdenum, cerium-copper and cerium-nickel-copper. These may be used alone or, in combination and may be used on suitable carriers such as silica gel, alumina gel, pumice and charcoal. Additional catalysts disclosed in the aforementioned applications include silica gel, fuller's earth, bauxite, activated alumina and clays that are effective for the removal of color and gum forming bodies in petroleum oils. These may be used alone or with compounds of metals of groups V, VI, VII and VIII of the periodic table. Also useful are the oxide and sulphide of silver as well as activated bauxite such as the well known commercial "Florite."

It has now been found that the reaction between olefin hydrocarbons and sulphur may be controlled, the rate of depreciation of catalyst may be greatly reduced and improved yields of desirable products obtained by contacting the olefinic hydrocarbons and sulphur in the presence of materials which act as controllers of the reaction. These reaction controllers may be materials which are unreactive or mildly reactive under the conditions employed, that is, the reaction controllers are less reactive than one or both of the primary reactants, namely, sulphur and hydrocarbon and which are gaseous under reaction conditions. Reaction controlling agents which may be used include nitrogen, carbon disulphide, hydrogen sulphide, methane or other low boiling paraffin hydrocarbon such as ethane, and sulphur dioxide. These materials may be used individually or in combinations of two or more. While improved results may be obtained with widely varying amounts of reaction controlling agents particularly effective results are secured by the use of between approximately 10% and 100% by volume (gaseous) of agent based on the olefin hydrocarbon charged to the reaction zone.

An indication of the nature of the results obtainable when using reaction controlling agents in accordance with this invention may be seen from the data set forth below showing the catalytic conversion of propylene and butylene to carbon disulphide. In conducting experimental runs to study this reaction it was found that it was impossible to complete runs of two hours duration at temperatures of approximately 350 to 750° C. due to plugging of the transfer lines and catalyst chamber with tarry carbonaceous deposit. When reaction controlling agents were used the duration of the runs was greatly increased.

Example I

Propylene was charged to a reaction chamber containing 100 cc. of 8–14 mesh Florite as catalyst at a rate of 0.5 cubic feet per hour. 3.67 cubic feet per hour of vapors of elementary sulphur (calculated at $S_2$) admixed with 0.1 cubic feet per hour of nitrogen was contacted with the propylene in the catalyst chamber at a temperature of 625° C. The duration of the run as determined by plugging of the apparatus was 3.5 hours during which time a liquid condensate was obtained which analyzed 93.7% by weight of carbon disulphide.

Example II

Propylene was passed through a reaction chamber containing a catalyst composed of 100 cc. of 8–14 mesh activated alumina impregnated with chromium oxide in the ratio of 20 parts of the former to 1 part by weight of the latter calculated as chromium at a rate of 0.5 cubic feet per hour. 2.47 cubic feet per hour of vapors of elementary sulphur (calculated as $S_2$) in admixture with 0.05 to 0.1 cubic feet per hour of sulphur dioxide was contacted with the propylene in the reaction chamber at a temperature of 650° C. A liquid condensate containing 91.7% carbon disulphide was obtained. The duration of the run was approximately 6 hours. The same apparatus and catalyst was used for a similar 4 hour run prior to the run just described and was also used for a subsequent run of 6 hours, making a total of 16 hours of operation without any indication of plugging of the apparatus.

Example III

Butylene was charged to a reaction chamber containing 200 cc. of 8–14 mesh Florite as catalyst at a rate of 0.5 cubic feet per hour. 0.5 cubic feet per hour of methane admixed with 4.94 to 8.65 cubic feet per hour of sulphur vapor was contacted with the butylene in the catalyst chamber at a temperature of 700° C. The variation in the sulphur feed was caused by mechanical difficulties. The duration of the run was 3 hours during which time a liquid condensate containing 96.6% of carbon disulphide, no thiophene, no mercaptans and 0.66% sulphur as sulphide was obtained.

The rate of formation of tarry material, as indicated by the duration of the runs, was greatly reduced and the yield of carbon disulphide was not only increased but the carbon disulphide content of the liquid reaction product was greater, when reaction controlling agent was used.

Temperatures between approximately 350° C. and 750° C. and preferably between approximately 600° C. and 750° C. are employed. Space velocities, i. e., the ratio of the total volume of gases at 0° C. and 760 mm. pressure passed in contact with the catalyst per hour to the volume of catalyst may be varied between wide limits but are preferably between approximately 400 and 1000. The process is operative at atmospheric, superatmospheric or subatmospheric pressures. Low superatmospheric pressures are preferred. Although lower concentrations of sulphur can be used, the sulphur is preferably employed in an amount of 10% to 15% by weight in excess of the amount theoretically required for the complete conversion of all the carbon atoms and hydrogen atoms in the hydrocarbon charged to carbon disulphide and hydrogen sulphide, respectively in accordance with the equation $$C_nH_{2n} + 3/2nS_2 \rightarrow nCS_2 + nH_2S$$

No satisfactory explanation of the behavior of the particular reaction controlling agents named herein has been found, but it has been determined nevertheless that the formation of undesirable high boiling reaction products and the effective life of the catalyst employed to promote the reaction between olefinic hydrocarbons and sulphur is greatly increased when reaction controlling agents are used in accordance with the invention herein set forth.

What is claimed is:

1. The process for producing carbon disulphide by reaction of gases consisting substantially entirely of olefins and sulphur in the presence of a catalyst capable of promoting the formation of carbon disulphide which comprises contacting said gases and sulphur with a catalyst at reaction temperature of approximately 350 to 750° C. in the presence of an added reaction controlling agent which is gaseous at reaction temperature and less reactive than the olefins at reaction temperature, the volume of reaction controlling agent being not less than 10% and not in excess of the volume of olefinic gas.

2. Method in accordance with claim 1 where the reaction controlling agent is hydrogen sulphide.

3. Method in accordance with claim 1 where the reaction controlling agent is sulphur dioxide.

4. Method in accordance with claim 1 where the reaction controlling agent is methane.

5. Method in accordance with claim 1 where the catalyst is selected from the group consisting of catalytic clays, bauxite, activated bauxite, silica gel and activated alumina and the reaction temperature is approximately 350 to 750° C.

6. The method in accordance with claim 1 where the catalyst is selected from the group consisting of catalytic clay, bauxite, activated bauxite, silica gel and activated alumina and the reaction temperature is between approximately 350 and 750° C.

7. Method in accordance with claim 1 in which the sulphur vapors are present in an amount of 10 to 15% by weight in excess of the amount theoretically required to react with the olefins to form carbon disulphide and hydrogen sulphide.

8. The method of producing carbon disulphide from gases consisting substantially entirely of olefins which comprises admixing sulphur vapors with a reaction controlling agent which is less reactive than the olefinic gases and gaseous at the reaction conditions and then contacting the sulphur-vapor in the presence of a catalyst capable of promoting the reaction between olefinic gases and sulphur gas mixture with olefinic gases in the proportion of 1 to 10 times by volume of said olefinic gases to 1 part by volume of said less reactive gas, at temperatures of 350 to 750° C., and separating carbon disulphide from the reaction mixture.

9. Process in accordance with claim 1 in which the reaction controlling agent is a low boiling paraffin hydrocarbon.

CARLISLE M. THACKER.